(12) United States Patent
Rozin et al.

(10) Patent No.: US 10,943,217 B1
(45) Date of Patent: Mar. 9, 2021

(54) METHODS SYSTEMS AND ARTICLES OF MANUFACTURE FOR MODIFYING USER INTERACTION WITH ONLINE BANKING SITE

(71) Applicant: Intuit Inc., Mountain View, CA (US)

(72) Inventors: Jacob Rozin, San Francisco, CA (US); Brandon J. Gador, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 600 days.

(21) Appl. No.: 14/014,102

(22) Filed: Aug. 29, 2013

(51) Int. Cl.
  *G06Q 20/10* (2012.01)
(52) U.S. Cl.
  CPC .................. *G06Q 20/108* (2013.01)
(58) Field of Classification Search
  None
  See application file for complete search history.

(56) References Cited

U.S. PATENT DOCUMENTS

| | | | |
|---|---|---|---|
| 5,903,881 A | 5/1999 | Schrader et al. | |
| 6,853,982 B2 * | 2/2005 | Smith | G06Q 30/02 705/26.7 |
| 7,613,692 B2 * | 11/2009 | Hamilton et al. | |
| 8,185,472 B1 * | 5/2012 | Boyd | G06Q 40/02 705/43 |
| 2004/0199584 A1 * | 10/2004 | Kirshenbaum | G06F 16/9577 709/205 |
| 2006/0155764 A1 * | 7/2006 | Tao | G06F 21/604 |
| 2009/0249218 A1 * | 10/2009 | Hamaoui | G06F 16/9562 715/745 |

OTHER PUBLICATIONS

Crosman, Penny "BankSimple Aims to Declutter Mobile, Online Banking," http://www.banktech.com/channels/banksimple-aims-to-declutter-mobile-onli/229218704, Feb. 15, 2011 (Year: 2011).*
http://uxdesign.smashingmagazine.com/2010/02/25/designing-user-interfaces-for-business-web-applications/.
http://www.banktech.com/channels/banksimple-aims-to-declutter-mobile-onli/229218704.
www.citi.com.
http://www.lellsdistillate.com/?p=76.

* cited by examiner

*Primary Examiner* — David P Sharvin
(74) *Attorney, Agent, or Firm* — DLA Piper LLP (US)

(57) ABSTRACT

Data of prior online banking sessions is logged or stored and analyzed to identify online banking action patterns and pages or screens of an online banking website used to execute the actions. User profile data associated with executed actions is also identified. User profile data may involve the computing device used to access the site, location and/or temporal data such as date, time and frequency. When profile data of a current online banking session is received, rules dictating how the user interface of the online banking website can be selectively modified are accessed and applied to identify a page or screen to be presented to the user thus bypassing at least one intermediate page or screen that would have otherwise been presented to the user navigating the online banking website according to its predefined structure.

24 Claims, 15 Drawing Sheets

METHODS SYSTEMS AND ARTICLES OF MANUFACTURE FOR MODIFYING USER INTERACTION WITH ONLINE BANKING SITE

SUMMARY

Embodiments are directed to dynamic and adaptive online banking systems, methods and products, and such systems, methods and products that predict how a user will interact with an online banking website to modify a user's interaction with the online banking website.

Embodiments are also directed to providing a dynamic online banking experience to users of a static online banking website having a pre-defined and fixed user interaction structure.

Embodiments are also directed to aggregating and analyzing data of online banking actions to identify recurring or repeating online banking actions or patterns, which are used to modify user interactions with the online banking website during subsequent online banking sessions.

Embodiments are also directed to selectively modifying or changing how users interact with online banking websites. Such modifications or changes can be implemented by creation of one or more new websites or transforming the original website into one or more modified websites, and a new or modified website that is selected according to embodiments may be temporarily presented to the user depending on user profile data. Modifications or changes may also be implemented by maintaining the structure and sequence defined by the online banking website and instead directing the user to a screen or page that is out of sequence compared to the sequence defined by the online banking website, thus jumping or bypassing one or more intermediate screens that would have normally been clicked through by the user in order to reach the screen or page.

Further embodiments are directed to intelligent online banking systems that can adapt to how and when a user accesses an online banking website and that learn from indirect and direct user feedback to adjust how interactions are modified in the future.

Yet other embodiments are directed to eliminating the need to navigate various pages or screens of the online banking website in order to reach a particular page or screen to execute a desired online banking action by predicting which page is needed for an action to be performed and skipping or bypassing intermediate pages that are not used for that action.

Embodiments are also directed to automatically directing the user to a particular page or screen of the online banking website without the user requesting the particular page or screen and without the use of a bookmarking mechanism of a browser.

Further embodiments are directed to predicting which online banking actions will be executed or predicting which page or screen will be accessed for execution of an online banking action and bypassing screens or pages of the online banking website that the user would otherwise click through in order to reach the page or screen for executing the action. One embodiment is directed to determining which page of an online banking website to present to a user, other than a home page, following the user logging into the financial account.

Embodiments are also directed to a rule-based determinations regarding to which page or screen of an online banking website a user should be directed.

Embodiments are also directed to using user profile data or data associated with how, when and where access to the online banking website was established or other circumstances involving the user applicable or that existed in the past when the user previously executed online banking actions. This is used to determine which pages or screens of the online banking website will be presented to the user during a current online banking session and based at least in part upon the access, user profile or circumstances applicable to the current online banking session.

Embodiments are also directed to analyzing how users interacted with online banking websites in the past to determine how their interactive experienced can be modified in the future. One embodiment is directed to predicting which page of an online banking website will be utilized by analyzing user profile data for the current online banking session and results of analysis of prior online banking session data indicating which actions were performed or which pages were executed to perform those actions and associated prior user profile data.

Yet other embodiments are directed to enabling a user to complete an online banking action more quickly and eliminating the need to navigate or click through at least one page or screen of the online banking website to reach a page or screen predicted to be needed by the user.

Additional embodiments are directed to presenting a page or screen to a user of an online banking website during an online banking session when that page or screen was not requested by the user during that online banking session.

One embodiment is directed to a computer-implemented method for predicting or determining which page or screen of an online banking website should be presented to a user accessing a financial account through the online banking website, which has a pre-defined interaction structure. The method is performed by a computer, which may be a computer of a financial institution at which the user as the account or an intermediate computer in communication with and between a user's computing device and a financial institution computer. The method comprises the computer analyzing logged data of prior online banking sessions. The logged data analysis results in the computer identifying a page or screen of the online banking website accessed by the user to execute a recurring online banking action during respective different online banking sessions and respective user profile data associated with the recurring online banking action. The method further comprises, when the user engages in a current online banking session (after the user has logged out of a prior online banking session), the computer comparing user profile data of the current online banking session and logged user profile data from prior online banking sessions. When the user profile data of the current online banking session matches logged user profile data, the computer presents the identified page or screen associated with the logged user profile data to the user such that at least one other page or screen of the pre-defined interaction structure that would have been presented to the user while navigating to the identified page or screen is bypassed. In this manner, a prediction about what page or screen the user will want allows for a shortcut to the identified page or screen after the user has logged in rather than requiring the user to navigate through one or multiple other intermediate pages or screens in order to eventually reach the identified page or screen.

A further embodiment is directed to a computer-implemented method for predicting which page or screen of an online banking website to present to a user accessing a financial account through the online banking website having a pre-defined interaction structure and comprises a computer analyzing logged data of prior online banking sessions and identifying a recurring online banking action performed during multiple online banking sessions based at least in part upon analyzing logged data. The method further comprises the computer identifying a page or screen of the online banking website that was accessed by the user to execute the recurring online banking action, and identifying user profile data associated with the recurring online banking action. The method further comprises generating or updating a rule indicating that the user should be directed to the identified page or screen when user profile data of a subsequent online banking session matches the user profile data of the generated or updated rule. Rule and user profile data can be stored in a data store, database or table for subsequent comparisons and processing during subsequent online banking sessions.

In yet another embodiment, a computer-implemented method for predicting which page or screen of an online banking website to present to a user accessing a financial account through the online banking website having a pre-defined interaction structure comprises a computer determining that the user has logged into the financial account to initiate a current online banking session and receiving or determining user profile data of the current online banking session. The method further comprises the computer performing a comparison of the received or determined user profile data and user profile data recited in a plurality of rules and identifying an applicable rule of the plurality of rules based at least in part upon the comparison. The computer directs the user to a page or screen of the online banking website based at least in part upon the applicable rule without the user requesting to be directed to the page or screen.

Other embodiments are directed to computer program products comprising a non-transitory computer readable storage medium embodying one or more instructions executable by a computer hosting an online banking website to execute computer-implemented processes for determining or predicting which page or screen of the online banking website to present to a user accessing a financial account through the online banking website having a pre-defined interaction structure.

Yet other embodiments are directed to systems configured to determine or predict which page or screen of the online banking website to present to a user accessing a financial account through the online banking website having a pre-defined interaction structure. System embodiments comprise a computer configured to implement embodiments and to execute articles of manufacture or computer program products.

In a single or multiple embodiments, if user profile data of the current online banking session does not match logged or stored user profile data, then no modification is made and the computer presents the online website to the user as is, or in its normal, pre-defined configuration or pre-defined sequence, such that the user navigates to the pre-defined interaction structure without bypassing any pages or screens of the pre-defined interaction structure as the user did in the past. For example, after the user goes to the online website and enters a username and password or other credentials into a login page, the user is directed to a home page of the online banking website where the user can select various links or menu options to be directed to other pages or screens involving, for example, account summary, payments, transfers, credit card, loans, etc. Thus, when there is no match, the user navigates the online banking website as the user has done in the past, whereas when there is a match, the user may be directed to a particular screen or page after log in (e.g., immediately after log in), bypassing various intermediate pages or screens such that the identified page or screen is the next page or screen presented to the user after the user logs into the financial account. Thus, after the user logs into the financial account through the online banking website, the identified page or screen can be presented to the user before any other page or screen of the online banking website is presented to the user and before the home page. Online banking and user profile data for additional or other online banking sessions of different times may also be logged and analyzed to identify other pages or screens that are selected as being presented to the user for different circumstances based on the additional or other user profile data.

In a single or multiple embodiments, data of multiple online banking sessions is analyzed to identify a recurring online banking action that occurred during those multiple sessions, and the page or screen that was utilized to execute the same online banking action is identified as a page or screen to be presented to the user based on pre-determined criteria. For example, in one embodiment, the pre-determined criteria is a number of instances of the action during different online banking sessions, and in one embodiment, a particular action is identified as the recurring online banking action when the action occurred in three different online banking sessions.

Embodiments may involve analyzing logged data to identify one or multiple recurring online banking actions. Thus, when first and second online banking actions are identified from data of prior online banking sessions, embodiments may involve comparing user profile data of a current online banking session and determining which of multiple identified pages or screens should be presented to the user based at least in part upon comparing the user profile data of the current online banking session and logged user profile data.

In a single or multiple embodiments, the user profile data indicates how the user accessed the online banking website, which may involve a type of computing device and/or network connection utilized to access the online banking website. For example, the user profile data may indicate which computer or computing device or mobile communication device such as a smartphone was utilized to access the online banking website. As another example user profile data may indicate a location of a computing device utilized to access the online banking website. Location data may be, for example, a residence or a place of employment of the user or other location. Location data may be or may be determined based on location data such as an Internet Protocol (IP) address of the computing device and/or geographic location data provided by the user, based on location or address data of the financial account accessed by the user, or other location data transmitted by the computing device.

In a single or multiple embodiments, the user profile data indicates when the user accessed the online banking website through one or more or all of a date, time and/or frequency of accessing the online banking website. Embodiments may involve multiple types of user profile data such as at least two, there or more of computing device, location, date, time, and frequency data.

In a single or multiple embodiments, user profile data of the current online banking session is used to identify a rule that indicates which identified page or screen will be presented to the user after logging into the online banking account. Embodiments may involve if-then rules such that if the user profile data of the current online banking sessions is a specified type of data, then a particular page or screen of the online banking website is to be presented to the user, e.g., as the next page or screen after the user logs into the online banking account to bypass at least one intermediate page or screen that would have normally been presented in the absence of application of the rule. Embodiments may involve existing rules, updating of rules as data of online banking actions and associated user profile data are analyzed, and generation of new rules as new recurring actions and associated user profile data are identified.

In a single or multiple embodiments, a request for feedback is presented to the user regarding whether the system correctly predicted the screen or page that the user would have selected for an online banking action. The feedback may confirm that the prediction was correct, and a table or database can be updated reflecting that result.

Feedback may indicate that the user did not want or need that screen or page, in which case the that feedback can be used for adaptive learning such that the applicable identified recurring action, rule and/or user profile data can be marked as requiring further analysis with additional online banking session data. Thus, feedback can be used to indicate the accuracy or strength of a rule, update a rule, or result in generation of a new rule.

Thus, with embodiments, the user, e.g., after logging into the financial account by entering a user name and password, can be directed to the identified page or screen without a use of a browser bookmark and without the user requesting the identified page or screen or navigating to the identified page or screen. Rather, with embodiments, prior online banking actions and associated user profile data are identified to predict which pages or screens the user needs given a particular set of circumstances and can direct the user to that page or screen directly from an early stage page or screen such as a login page or screen, without requiring the user to navigate intermediary pages or screens that would otherwise have to be navigated utilizing the pre-defined structure of the online banking website.

BRIEF DESCRIPTION OF THE DRAWINGS

The foregoing and other aspects of embodiments are described in further detail with reference to the accompanying drawings, wherein.

DETAILED DESCRIPTION OF ILLUSTRATED EMBODIMENTS

Embodiments are directed to modifying how a user interacts with an online banking website and serving up pages or screens for actions to be performed that are predicted to be used or needed by a user. With embodiments, rather than traditionally navigating through an online banking website having a pre-defined interaction structure (e.g., a sequential series of clicks in order to reach a certain page or screen), embodiments allow at least one screen presented after a user logs into a financial account to be bypassed or skipped, thus allowing the user to jump directly to a screen or page of the online banking website used to execute an online banking action that was previously executed in a prior online banking session. For this purpose, embodiments utilize both data of prior online banking session activity and profile data or data associated with one or more of how, when and from where current access to the online banking website was established. Thus, embodiments are able to impart a dynamic and adaptive interaction experience to users of an online banking website that is has a pre-defined, static interaction structure.

Figure 1:
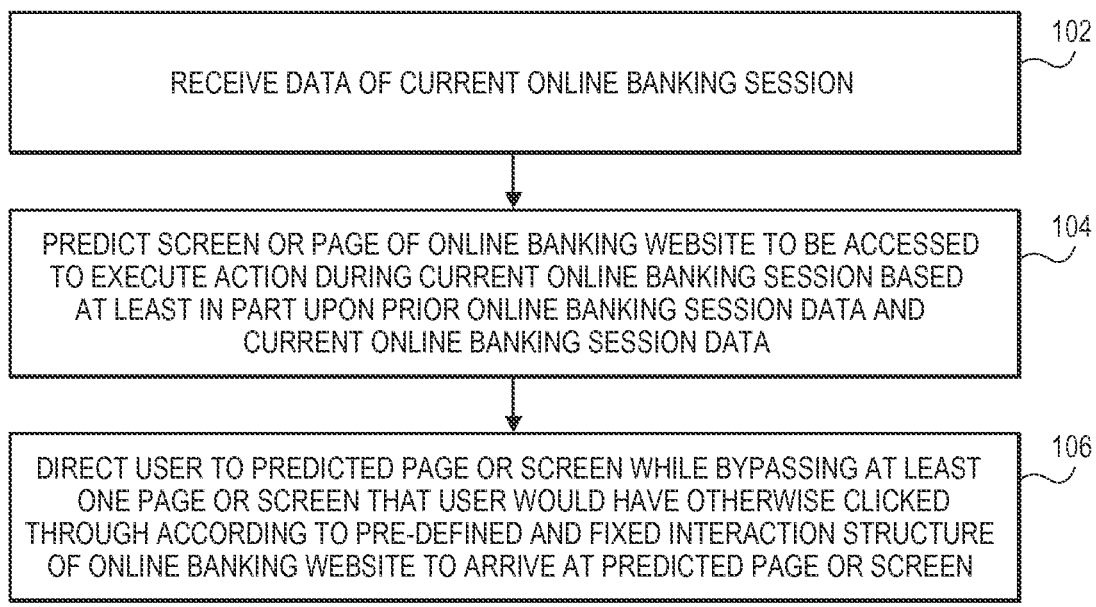
FIG. 1 is a flow diagram illustrating one embodiment of a computer-implemented method for modifying how pages of an online banking website are presented to a user accessing an financial account through the online banking website.
Figure 2:
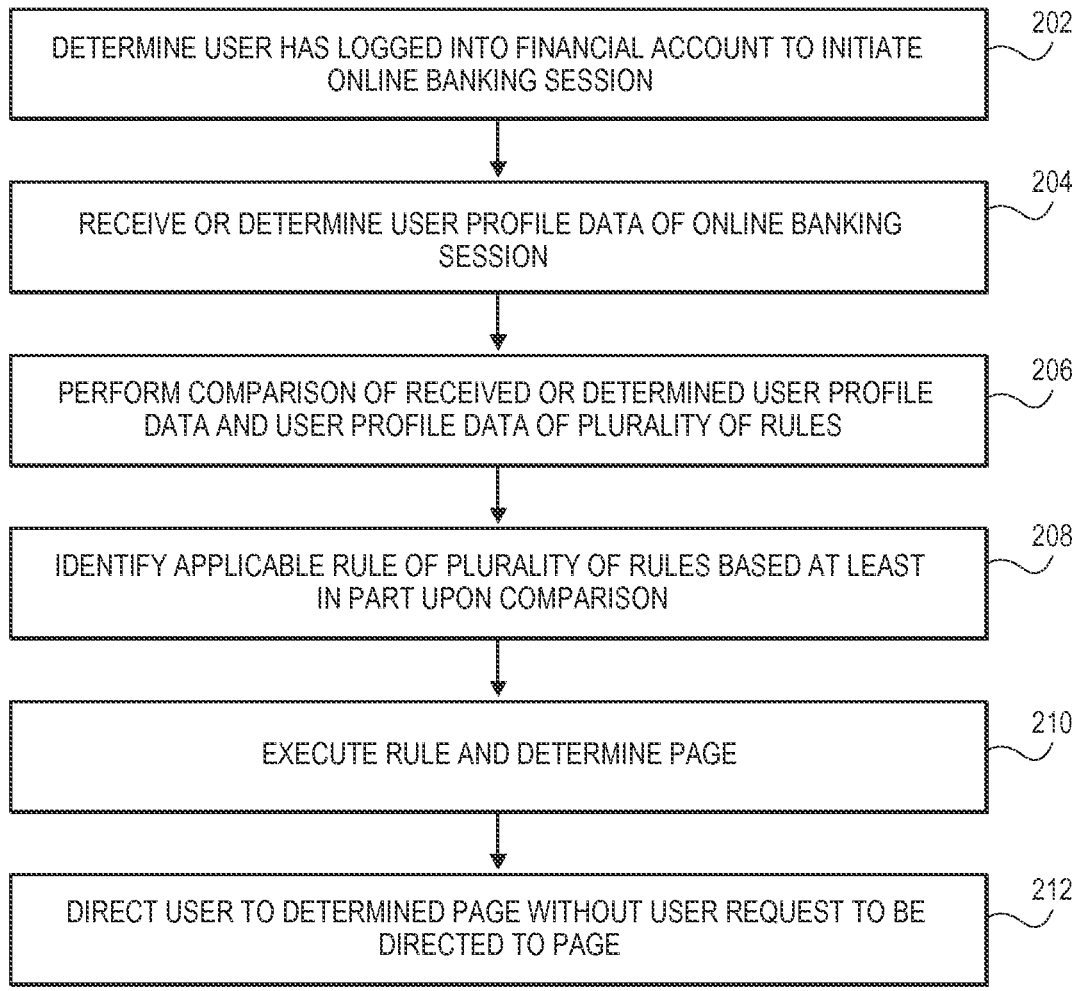
FIG. 2 is a flow diagram illustrating one embodiment of a computer-implemented rule-based method for modifying how pages of an online banking website are presented to a user.

Referring to FIG. 1, in a method according to one embodiment, at 102, the user accesses a financial account online and data of current online banking session such as user profile data associated with the current online banking session is received. At 104, a prediction is made regarding which screen or page of online banking website is to be accessed by the user to execute a certain action during the current online banking session. The prediction is based at least in part upon data of prior online banking sessions (sessions which are no longer active and terminated as a result of the user logging out of the financial account) and the data of the current online banking session. At 106, the user is directed to the predicted page or screen while bypassing at least one page or screen that user would have otherwise clicked or navigated through according to a pre-defined and fixed interaction structure of online banking website to arrive at predicted page or screen. Thus, with embodiments, the user is directed to a page of the online banking website that is different than the home page normally presented to the user after the user has logged into the financial account.

In one embodiment, a rule-based system is utilized to identify which screen or page of an online banking website should be presented to the user. In one embodiment, at 202, a determination is made that the user has logged into a financial account to initiate online banking session, e.g., based on entering a username and password, and at 204, user profile data of the online banking session is received or determined. At 206, the received or determined user profile data is compared with user profile data recited in a plurality of rules. At 208, a rule of the plurality of rules is identified or selected as being applicable to the current online banking session based at least in part upon the comparison, and at 210, the rule is executed or applied to identify or determine a page or screen of the online banking website. At 212, the user is directed to the determined page or screen without user requesting to be directed to page or screen, e.g., without the user searching for or clicking a link to the page or screen.

In one embodiment, prior and current online banking session data is used to direct the user from the login page, e.g., after the user has entered a username and password, immediately to a page or screen that was the subject of the prediction, and which is a page or screen other than the next or home page that would have been presented to the user according to the pre-defined interaction structure of the online banking website.

Figure 3A:
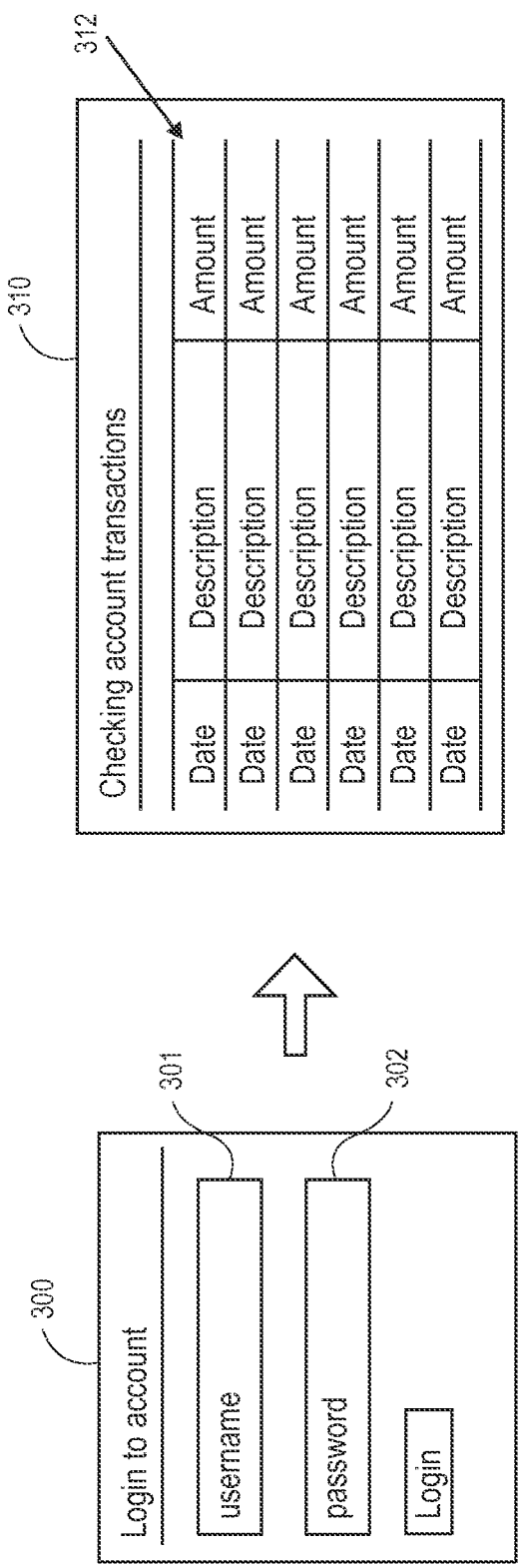
FIGS. 3A-C illustrate examples of how embodiments by automatically directing a user from a login page to a page that is predicted to be utilized by the user, while bypassing at least one intermediate page of the online banking website.

For example, referring to FIG. 3A, embodiments may be utilized to predict when a user will access a page 310 showing transactions 312 of a checking account such that after being presented with a login page 300 and entering login information such as a username 301 and password 302, the user is immediately directed (represented by "arrow") to the page or screen 310 showing transactions of the checking account, thus bypassing at least one other intermediary page or screen in the process (represented by "arrow").

Figure 3B:
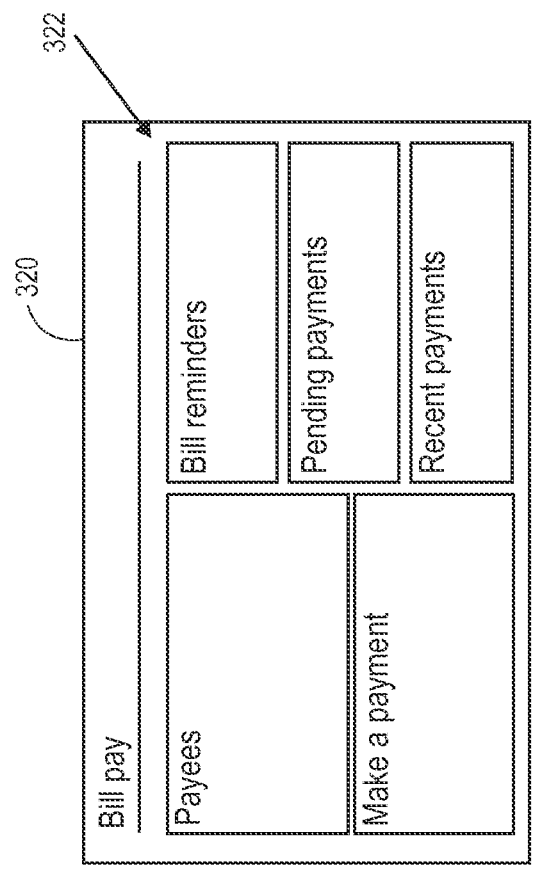

As another example, referring to FIG. 3B, embodiments may be utilized to predict when a user will access a page 320 with bill pay data or links 322 to bill pay data or actions such that after the login page 300 and entering login information of username 301 and password 302, the user is immediately directed to the bill pay page 320, thus bypassing at least one other intermediary page or screen in the process.

Figure 3C:
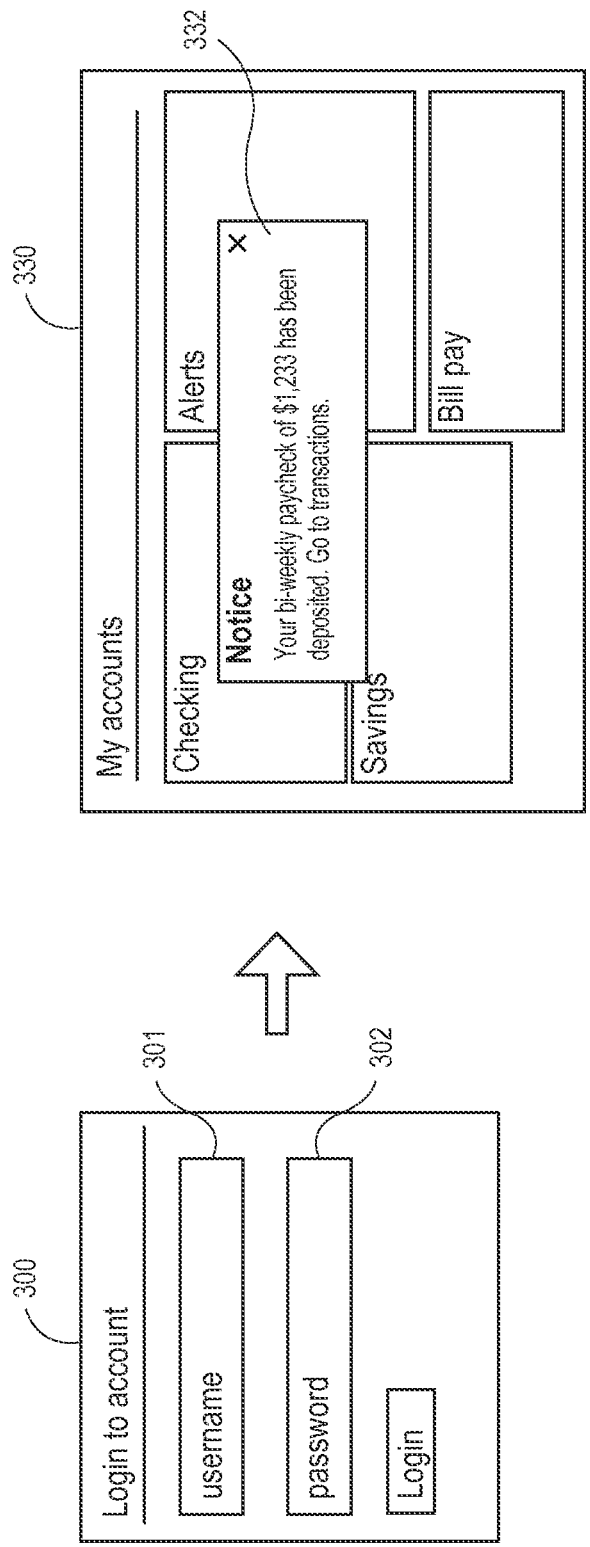

As yet another example, referring to FIG. 3C, embodiments may be utilized to predict when a user will access a page 330 with an account summary to check whether a paycheck was deposited such that after the login page 300 and entering login information of username 301 and password 302, embodiments have already determined whether the paycheck was deposited, and in the illustrated example, the user is immediately presented with a message 332 indicating that the paycheck was deposited based on the prediction that this is the reason why the user has logged into the financial account.

Thus, with embodiments, for example, when the user logs into the financial account on Date 1 (e.g., August 1), the user may be next directed to "Checking account transactions" after entering login information as shown in FIG. 3A. The user may then navigate the online banking website as desired from the "Checking account transactions" page and when completed, logs out to terminate the online banking session shown in FIG. 3A. The user logs in again on Date 2 (e.g., August 10), and the user is next directed to "Bill Pay" after entering login information as shown in FIG. 3B. The user may then navigate the online banking website as desired from the "Bill pay" page and when completed, logs out to terminate the online banking session shown in FIG. 3B, and when the user logs in again on Date 3 (e.g., August 15), the user is directed to "My Accounts" and is presented with a notice regarding electronic deposit of a paycheck. The user may then navigate the online banking website as desired from the "My Accounts" notification page and logs out to terminate the online banking session shown in FIG. 3C. Thus, embodiments change the interface for different dates based on predictions of what online banking actions a user will perform on those dates.

While FIGS. 3A-C illustrate particular examples of predicting which pages or actions the user will access or execute with regard to when the user has logged in for online access to the financial account, as will be understood in view of embodiments described in further detail with reference to FIGS. 4-13, embodiments are not so limited and may involve other types and numbers of types of "profile" data of the user to predict which page of the online banking system to serve or present to the user.

Figure 4:
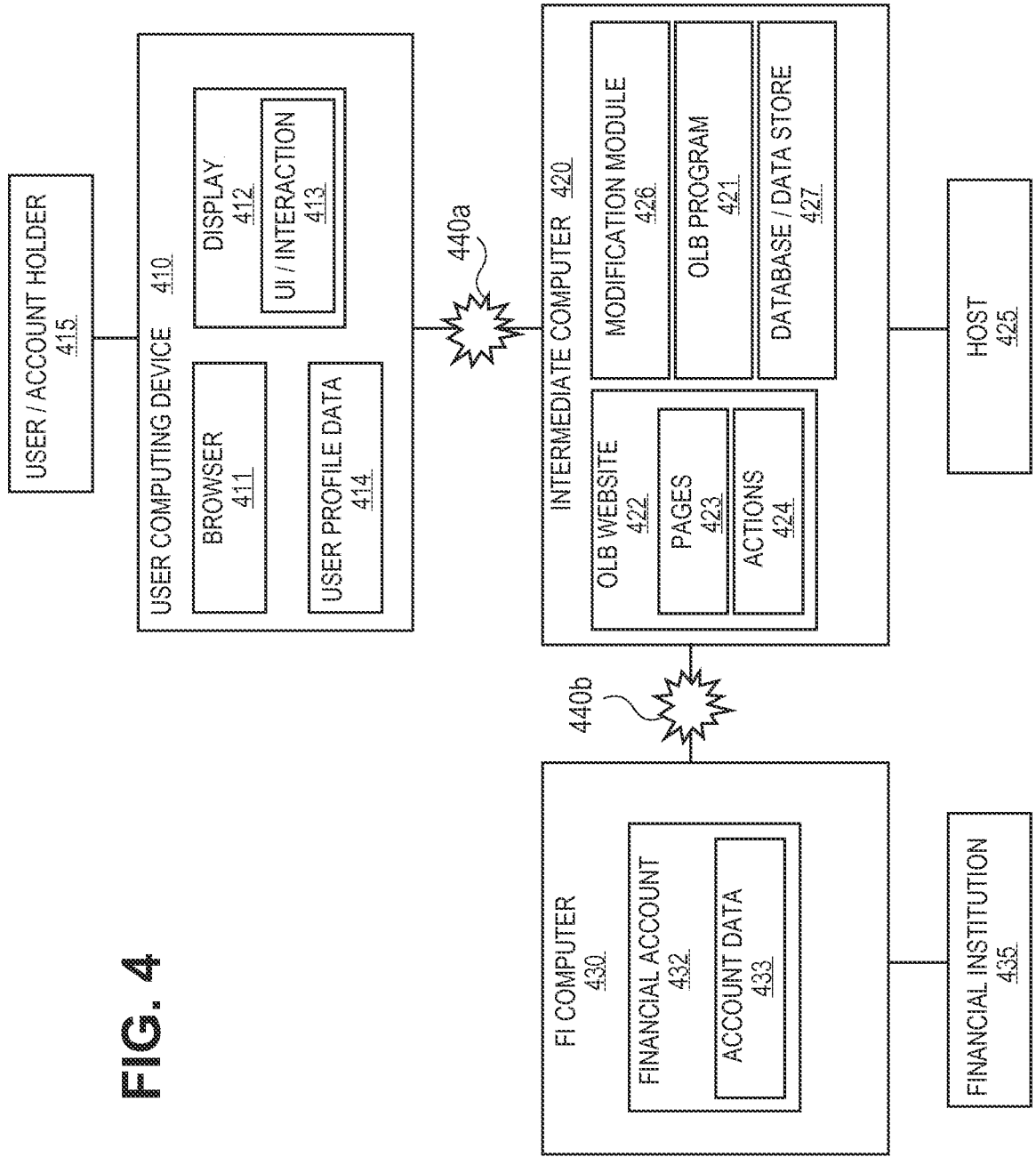
FIG. 4 illustrates components of a system constructed according to one embodiment in which an intermediate computer hosts an online banking website and modification module.

Referring to FIG. 4, a system 400 constructed according to one embodiment for modifying an online banking website or how a user interacts with an online banking website comprises or involves the user or account holder 415 (generally, user 415) that has a financial account 432 with a financial institution (FI) 435, and that can accessed through an online banking (OLB) website 422. In the illustrated embodiment, a computing device 410 of the user 415 is in communication with an intermediate computer 420 of a host 425, and the intermediate computer 420 is in communication with a computer 430 of the FI 435.

In the illustrated embodiment, the intermediate computer 420 hosts an OLB program or controller (generally, OLB program 421) that manages the OLB website 422 accessed by the user 415. The OLB program 421 or intermediate computer 420 is in communication with the FI computer 430 to access or receive and store data 433 of the user's account 432 with the FI 435 such that the account data 433 can be presented through the OLB website 422 to the user 415.

Figure 5:
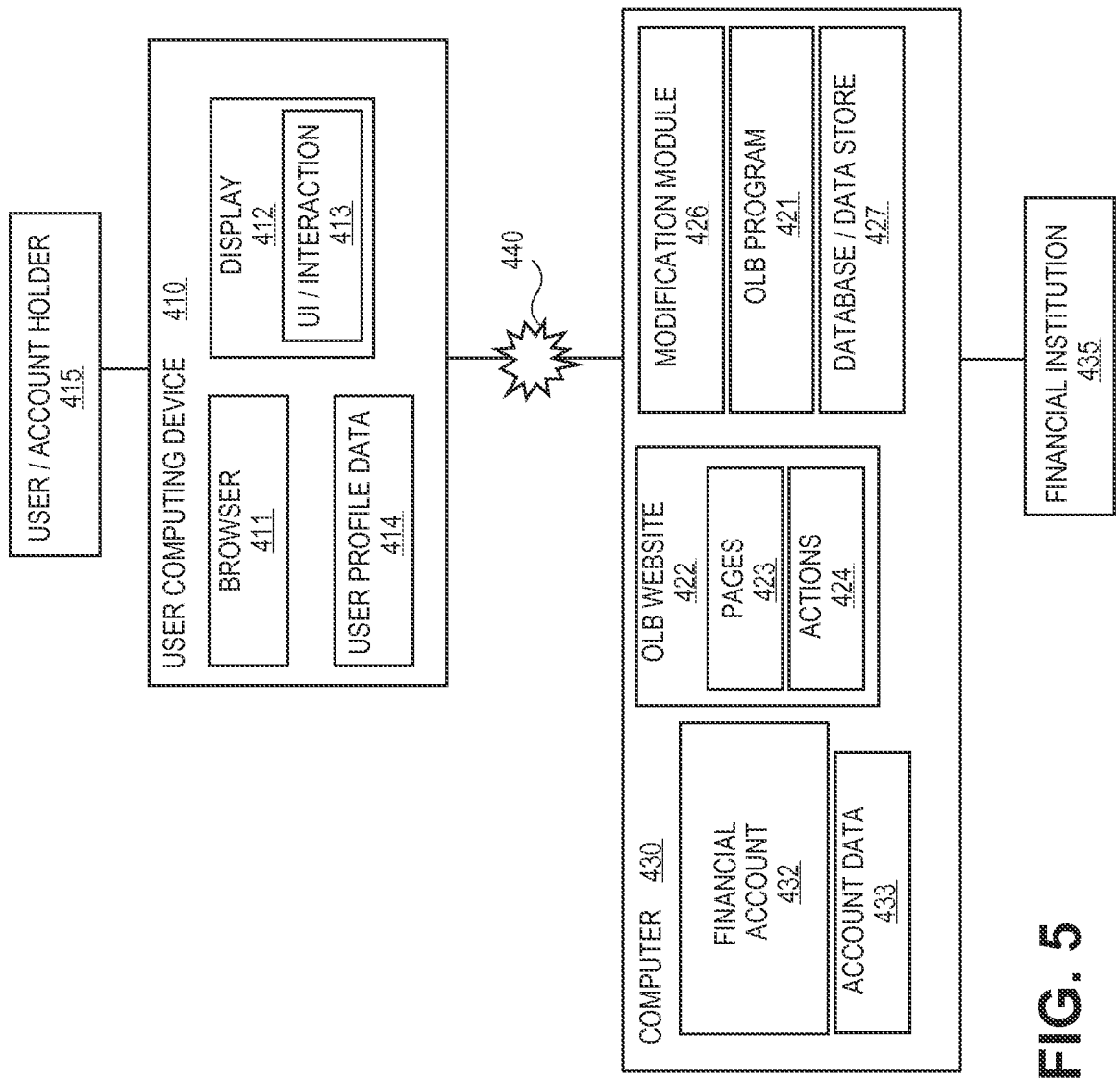
FIG. 5 illustrates components of a system constructed according to another embodiment in which a computer of a financial institution hosts an online banking website and modification module.

While FIG. 4 illustrates the OLB program 421 hosted by the intermediate computer 420 and the user 415 accessing the intermediate computer 420 for online access to the financial account 432, in other embodiments as shown in FIG. 5, the user 415 accesses the FI computer 430 directly, and the FI computer 430 hosts the OLB website 422 and OLB program 421. For ease of explanation, and not limitation, reference is made to the system shown in FIG. 4.

The user 415 is associated with a user profile or user profile data 414, which indicates how, when and/or from where the user 415 accessed the OLB website 422 and which online banking actions 424 were performed while the user 415 accessed the OLB website 422. For ease of explanation, reference is made generally to user profile data 414.

The user 415 may be an individual or corporate entity, and the user's computing device 410 may be a desktop computer, laptop computer, mobile computing or mobile communication device. For example, the user's computing device 410 may be a tablet computing device or a cellular telephone or smartphone that can communicate with the intermediate computer 420 or a desktop or laptop computer that at the user's residence or place of employment. For ease of explanation, reference is made generally to a user 415 and computing device 410, but as described in further detail below, the type of computing device 410 utilized to access the intermediate computer 420 may be a type of user profile data 414 that is a factor in determining which page or screen 423 of the OLB website 422 is selected by the modification module 426 for presentation to the user 415 according to embodiments.

The user 415 accesses the OLB website 422 via a browser 411 executing on the user's computing device 410 and by entering a Uniform Resource Locator (URL) address of the OLB website 422, the contents of which are accessed and rendered on the computing device's display 412. Browsers 411 that may be utilized for this purpose include INTERNET EXPLORER, GOOGLE CHROME and MOZILLA FIREFOX browsers.

One example of a host 425 that manages intermediate computer 420 and provides OLB website 422 is Intuit Inc., Mountain View, Calif. Users 415 may have various numbers and types of accounts 432 with FIs 435 including a checking account, savings account, money market account, credit card account, an account for a loan such as a mortgage, car loan or education loan. Such accounts 432 may have different types of account data 433 depending on the type of account 432. For example, account data 433 may include balances, transactions, payments, pending payments or payments in process and deposits and account summaries. The user 415 may also be able to execute various types of actions 424 through the OLB website 422 such as bill pay or electronic payment of bills or loans, transferring funds from one account to another account, accessing a particular transaction history page to confirm that a paycheck was electronically deposited. For ease of explanation, reference is made generally to action 424 or action executed during an online banking session.

The OLB website 422 includes a set of related web pages 423 or documents including content or instructions based on, for example, Hypertext Markup Language (HTML), and are accessed by the browser 411 utilizing the Hypertext Transfer Protocol (HTTP), and in the case of online banking, this may involve secure communications and encryption via HTTP Secure, or HTTPS. Pages 423 of the OLB website 422 may be organized according to a pre-defined interaction structure in that the user 415 must navigate through or click through certain pages 423 in a particular pre-defined sequence in order to eventually reach the desired page for executing an online banking action 424. Depending on the complexity and sophistication of OLB websites 422 as a result of the multitude of features, functionality and services provided, the per-defined interaction structure OLB websites 422 may require the user 415 to navigate or click through multiple and sometimes a large number of pages 423 in order to eventually reach a desired page 423 to execute a particular online banking action 424.

User computing device 410 is in communication with or operably coupled to the intermediate computer 420 via one or more networks 440a, and intermediate computer 420 is in communication with or operably coupled to the FI computer 430 via one or more networks 440b (generally, network 440). Examples of networks 440 that may be utilized for communications between system components include but are not limited to a Local Area Network (LAN), a Wide Area Network (WAN), Metropolitan Area Network (MAN), a wireless network, other suitable networks capable of transmitting data, and a combination of such networks. For ease of explanation, reference is made to a network 440 generally, but various networks, combinations of networks and communication systems, methods and protocols may be utilized.

FIG. 4 illustrates an example involving only one user 415 and one account 432 the user 415 has at one FI 435, but it will be understood that embodiments may involve a single user that has one or multiple accounts at multiple FIs, multiple users that have accounts at a FI, multiple users that have one or multiple accounts at multiple FIs, and that the numbers of users, accounts and FIs may involve tens, hundreds and thousands of users, accounts and FIs. Accordingly, it will be understood that FIGS. 4-5 illustrate simplified examples of how embodiments may be implemented.

In the embodiment illustrated in FIG. 4, an interaction or UI modification module, element, program or plug-in 426 (generally, "modification module" 426) is in communication with the OLB program 421 and is configured to determine how the interaction or UI 413 of the OLB website 422 should be changed, modified or transformed, and when to implement such modification or transformation based on a prediction of why the user has logged into the OLB website 422. The modification module 426 may part of the OLB program 421, but is shown as a separate component in FIG. 4 to illustrate one possible implementation, and for ease of explanation, reference is made to predictions and UI or interaction 413 modifications being implemented by the modification module 426.

The OLB program 421 and modification module 426 are in communication with a database, table or other data structure 427 (generally, database 427), which stores account data 433 or other data processed or accessed by the OLB program 421 and data utilized and processed by the modification module 426.

Figure 6:
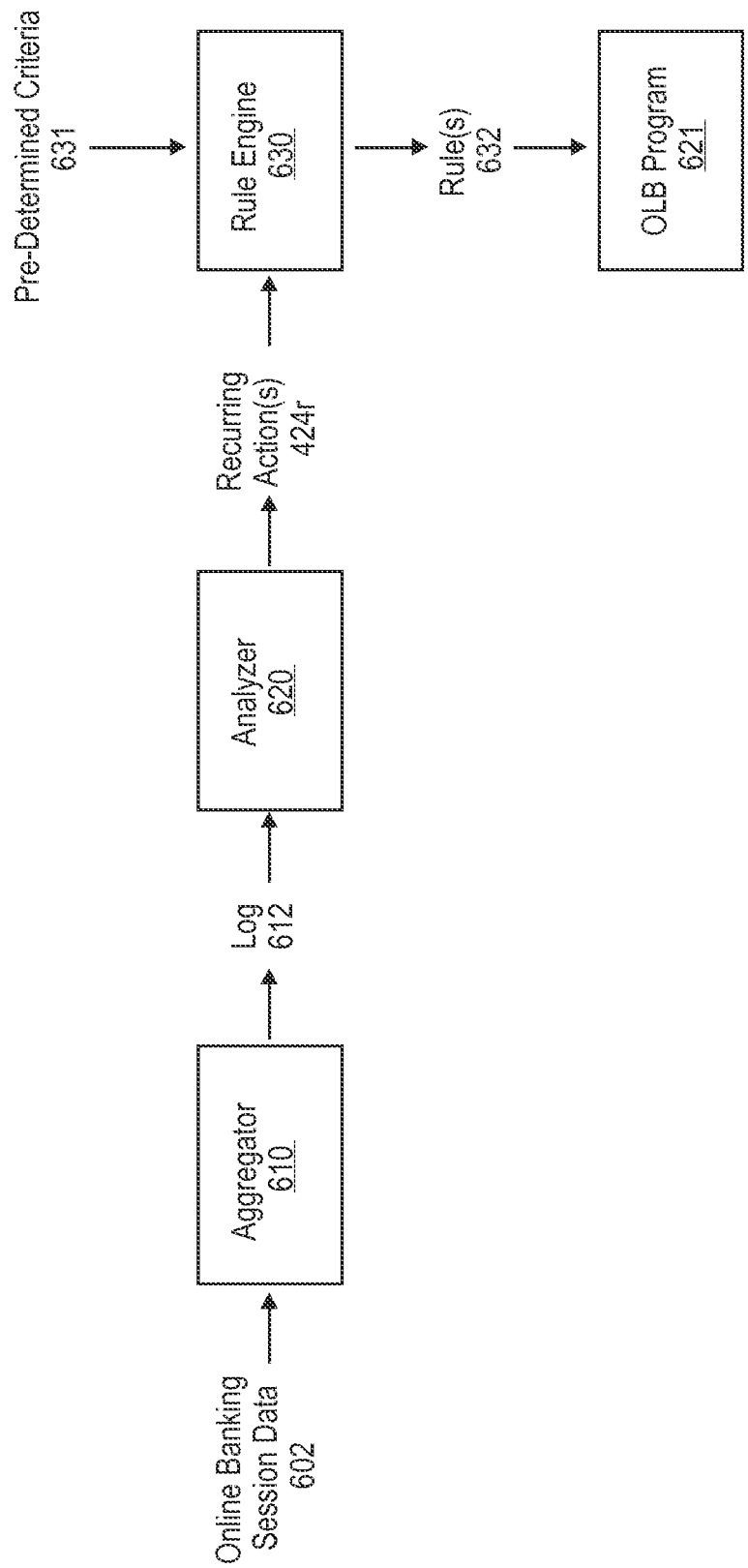
FIG. 6 is a system flow diagram illustrating components of a modification module according to one embodiment and how online banking session data is logged, analyzed for recurring online banking actions, and used to select, modify or generate rules for use in predicting which page of an online website should be presented to a user.

Referring to FIG. 6, a system flow diagram involving components of a modification module 426 constructed and operates according to one embodiment is illustrated and includes a data aggregation element 610, an analyzer 620 and rule engine 630. The aggregator 610 collects and stores data 602 of online banking sessions to a log 612 in the database 427. The online session data 602 may include user profile data 414 and data of pages 423 accessed and/or actions 424 performed by the user 415 during prior online banking sessions using those pages 423. The analyzer 620 processes the log 612 to identify online banking behavioral patterns or recurring online banking actions 424r ("r" referring to recurring action) and user profile data 414r ("r" referring to user profile data associated with the recurring action 424r). Data of the identified recurring action 424r and associated user profile data 414r for or of that action 424r are processed by the rule engine 630, which selects, modifies, generates or executes a rule 632. Which rule 632 is executed, and whether a rule 632 is selected, modified or generated, may depend on whether pre-determined criteria 631 involving the recurring action 424r is satisfied. Data processed or generated by these components is stored in the database 427 for use in analyzing data of subsequent or future online banking sessions during which the UI or interaction 413 experienced by the user 415 is selectively modified according to embodiments.

Figure 7:
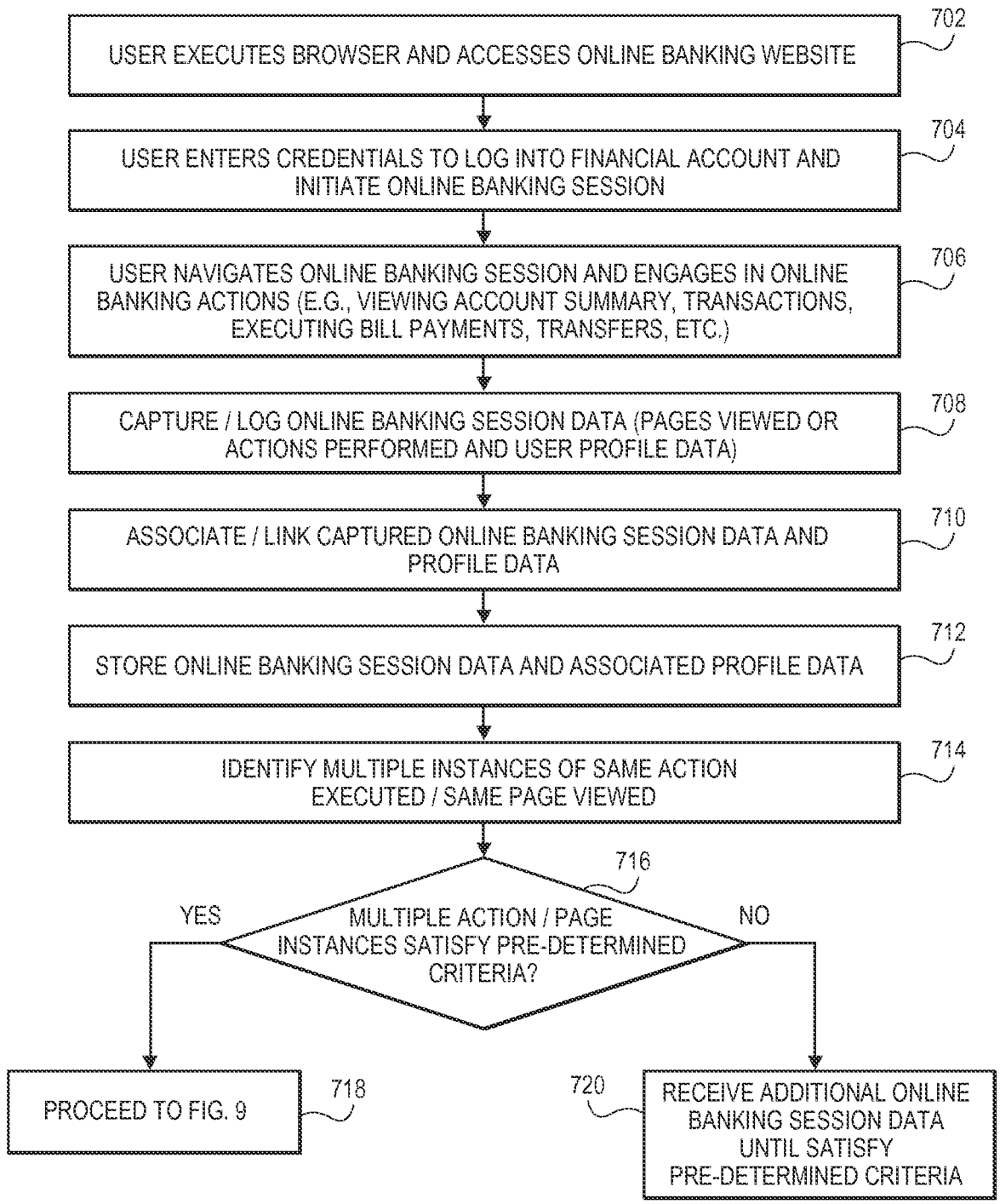
FIG. 7 is a flow diagram illustrating how online banking session data is processed to associate or link user profile data and recurring online banking actions.

FIG. 7 illustrates a method of aggregating and analyzing historical online banking session data 602 for use in determining how UI or interactions 413 of the OLB website 422 in future online banking sessions should be modified according to embodiments. At 702, the user 415 executes the browser 411 on the user's computing device 410 and accesses the OLB website 422. At 704, the user 415 is presented with a login page 300 (e.g., as shown in FIGS. 3A-B) and in response, enters credentials such as a user name 301 and password 302 to log into and gain online access to the financial account 432, thus initiating an online banking session. At 706, the user 415 navigates various pages 433 of the OLB website 422 and engages in one or more online banking actions 424. The user 415 may log in and out of the financial account 430 to perform various actions thus initiating and terminating various online banking sessions. This may occur over a number of days, months or years. At 708, the aggregation module 610 receives, retrieves, determines or collects online banking session data 602, which according to embodiments, includes various pages 423 accessed and/or actions 424 executed, and corresponding user profile data 414.

At 710, this data is recorded to the log 612, e.g., in a table of the database 627, which is used to associate or link online banking session data of the actions 424 performed and/or pages 423 viewed with corresponding user profile data 414. For example, online banking actions 424 may be viewing or accessing account summary, transaction history, completed transactions, and pending transactions, executing bill payments, scheduling or executing a bill payment, setting up a biller, transferring funds from one account to another, scheduling or executing a loan or credit card payment. User profile data 414 indicates how, when and/or where the user 415 accessed the OLB website 422 to execute an action 424.

The "how" aspect of user profile data 414 may indicate which computing device 410 or network 440 was utilized to access the OLB website 422, e.g., whether the computing device 410 was the user's home computer, work computer, a tablet computing device or a mobile communication device such as a smartphone. The "when" aspect of user profile data 414 may involve temporal data of when access was initiated or when the action 424 was executed, e.g., date and time data as determined from an Internet communications or HTTP requests, or other date/time data of the computing device 410 or intermediate computer or transmitted by the computing device 410. Another type of temporal data is the frequency with which a page 423 was accessed or action 424 executed, and as described in further detail below, the analyzer 620 determines the frequency with which the recurring action 424r was performed. The "where" or location aspect of user profile data 414 may indicate the location of the user 415 and/or the user's computing device 410 when a page 423 was accessed or action 424 was executed. Location data may be determined by, for example, Global Positioning System (GPS) data of the computing device 410, an Internet Protocol (IP) address of the computing device 410, or location data provided by the user 415 when the user 415 signed up for the financial account 432, or a previously identified or determined location of the computing device 410. Location data may differ for different computing devices 410, e.g., the user may utilize a home computer located at a San Francisco residence, the user's work computer is located in Mountain View, and the user's smartphone is determined via GPS. Location data can be derived or estimated from an IP address of the computing device 410 to determine, for example, cite, state or other location data of the computing device 410.

Figure 8:
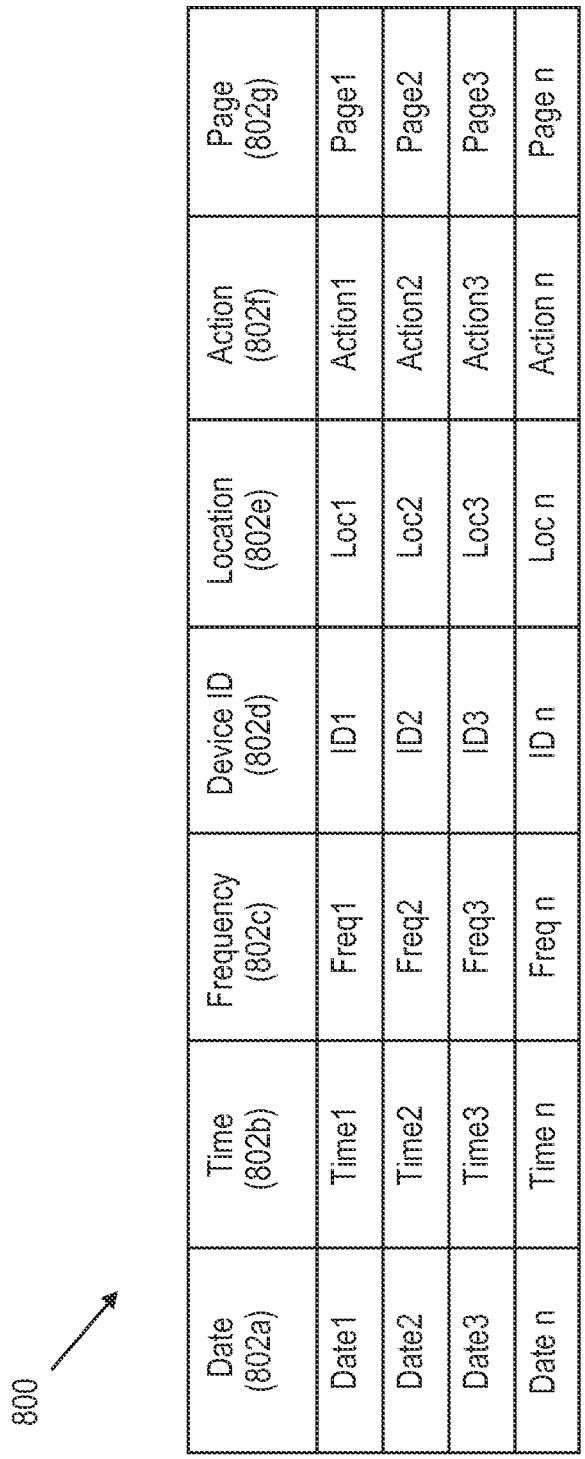
FIG. 8 generally illustrates a data structure identifying types of user profile data that can be utilized to predict which page of an online website should be presented to a user to modify a user interface or interaction experienced by the user while using the online banking website.

As generally illustrated in the table 800 shown in FIG. 8, the modification module 426 associates or links online banking session data such as pages 423 viewed and actions performed 424 and user profile data 414. While the illustrated example, the table 800 includes columns 802 a-g for user profile data 414 in the form of access or action date, access or action time, access or action frequency, computing device 410 identification, user 415 or computing device 410 location, action 424 executed and screen 423 accessed or presented when action 424 was executed for different online banking sessions, it will be understood that some or all of the user profile data 414 may be utilized and may be utilized in different combinations. Thus, embodiments may involve various combinations of date, time, frequency, computing device and location profile data, e.g., two, three, four or other numbers of types user profile data 414. Accordingly, FIG. 8 is provided as an example to illustrate how user profile data 414 of an online banking session can be received or determined, collected, and linked to a page 423 that was accessed and/or an action 424 that was executed during or when that particular user profile data 424 applied.

Referring again to FIG. 7, at 712, the table 800 shown in FIG. 8 or other log data structure is stored in the database 427 as necessary, and at 714, the analyzer 620 is executed to analyze the log 612 identify multiple instances of a recurring online banking action 424r the same page 423 being viewed to execute the recurring online banking action 424r.

Figure 9:
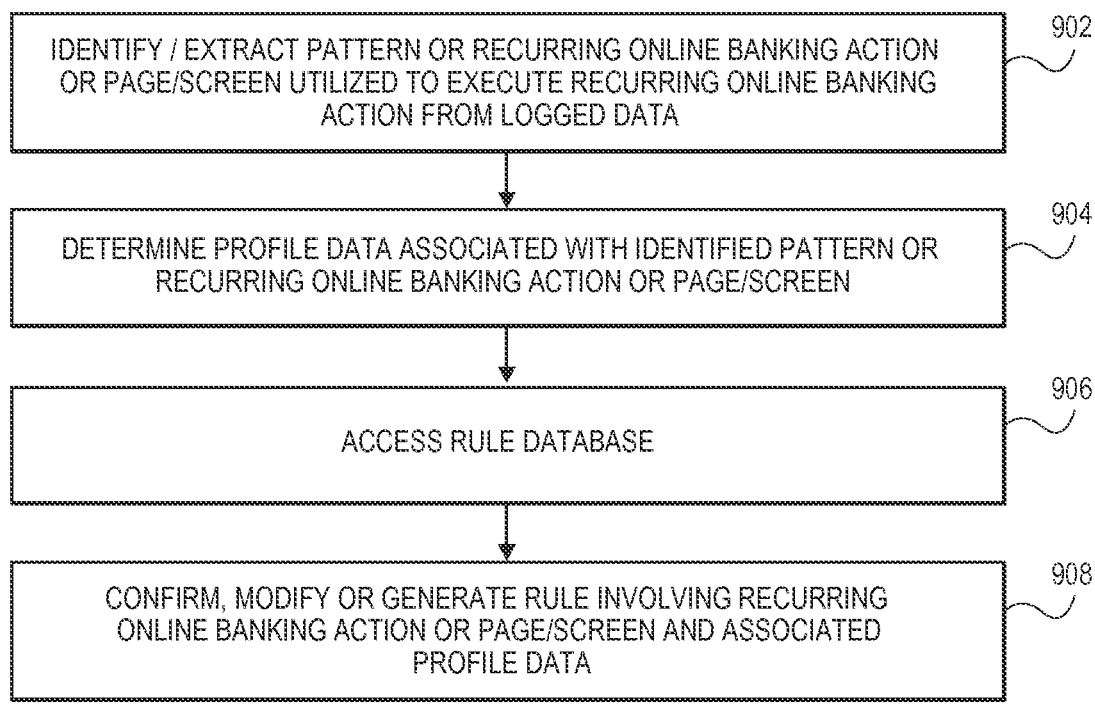
FIG. 9 is a flow diagram illustrating how one or more rules can be confirmed, modified or generated based at least in part upon a recurring online banking action and associated user profile data.

According to one embodiment, identifying a recurring online banking action 424r results in the method proceeding to FIG. 9, while in other embodiments, continuing with FIG. 7, at 716, a comparison is performed between the number of times the recurring action 424r occurred or other predetermined criteria 631. The pre-determined criteria 631 is a pre-determined minimum number or threshold number of times the action 424 was executed before it can be identified or selected as a recurring action 424r. In another embodiment, the pre-determined criteria 631 is a pre-determined number or threshold number of times an action 424 was executed within a specified period of time, e.g., the action 424 must have occurred three times in two months in order to be identified or selected as a recurring action 424r.

When the pre-determined criteria 631 is satisfied, at 718, the method proceeds to FIG. 9. Otherwise, when the pre-determined criteria 631 has not been satisfied, steps can be repeated to gather additional online banking session data until the pre-determined criteria 631 is satisfied.

Referring to FIG. 9, at 902, the pattern or recurring online banking action 424r or page 432 utilized for the recurring action 424r is identified or extracted from the logged data 612, and at 904, the modification module 426 or rule engine 630 thereof determines the user profile data 414r that is associated with the recurring action(s) 424r or page(s) 423 accessed. At 906, a database 427 or table of rules 632 is accessed, and at 908, a rule 632 involving the associated profile data 414 can be confirmed, modified or generated.

For example, confirming or maintaining a rule 632 may involve maintaining a count of the number of times a recurring action 424r has been executed and was associated with particular user profile data 414r such that the rule 623 is confirmed for future use when a pre-determined or minimum threshold ratio 631 of the number of times an action 424 has been executed and associated with the profile data 414 relative to the total number of times that action 424 has been executed is maintained. As another example, a rule 632 may be modified when the recurring action 424r was initially associated with first profile data 414r, but modified or updated to be also associated also with second or additional profile data 414r, or only associated with one profile data 414r. For example, this may occur when a first link between an action 424 and user profile 414 data was made at an early stage of analyzing that action 424, but as additional data was collected, the user profile data 414 is changed or updated. As yet another example, if it is determined that there is no existing rule 632 associating a recurring action 424r or screen and user profile data 414r, a new rule 632 is generated to reflect this extracted relationship between the identified recurring action 424r and associated user profile data 414r.

Figure 10:
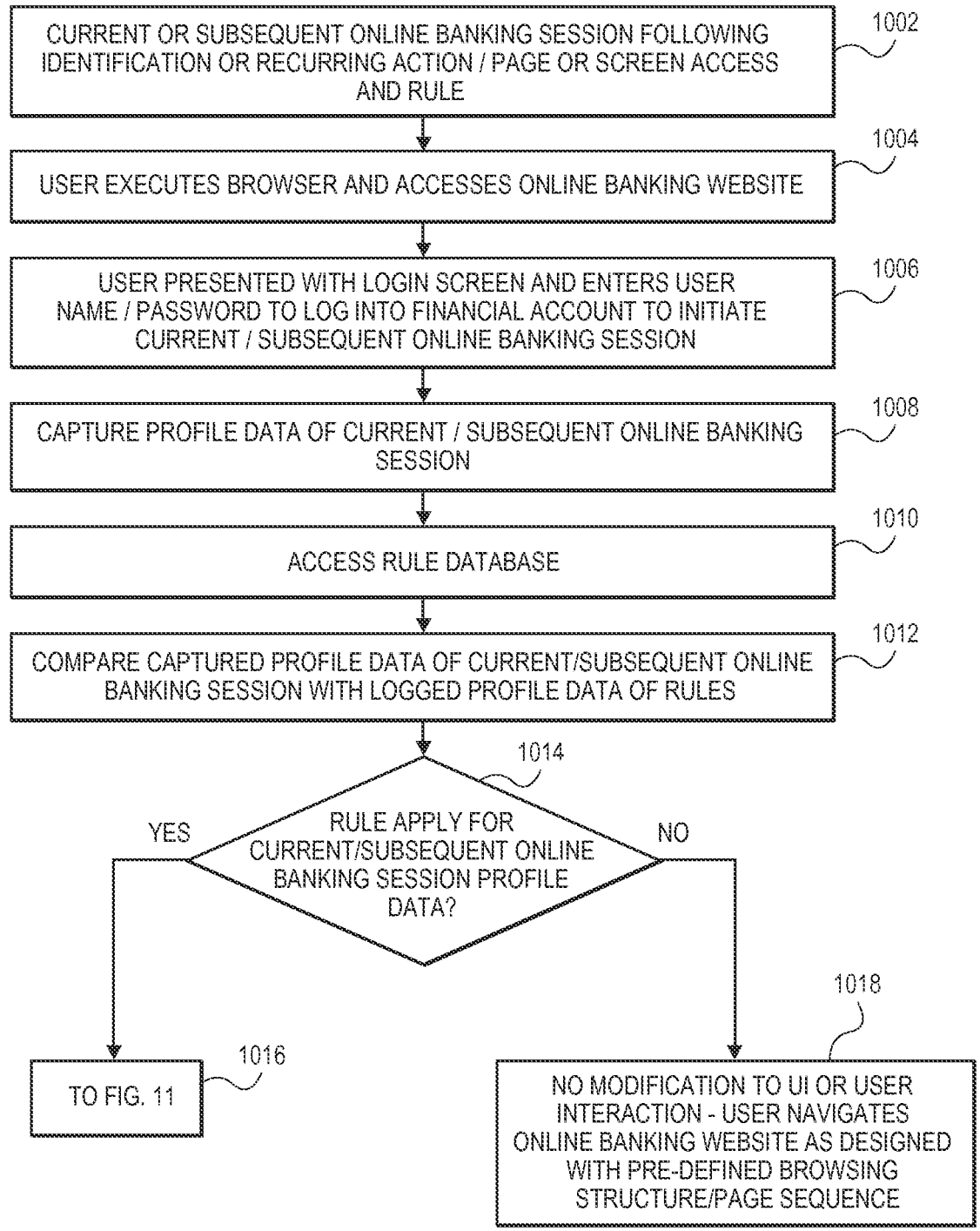
FIG. 10 is a flow diagram illustrating how embodiments are implemented by receiving, determining or deriving user profile data for a current online banking session and identifying a rule to be used to modify a user interface or interaction experienced by the user while utilizing the online banking website.

Referring to FIG. 10, at 1002, during a next, subsequent or current online banking session (generally, current online banking session) following identification of a recurring action 424r and associated user profile data 414r as described above, the user 415 executes the browser 411 and accesses the OLB website 422 at 1004. At 1006, the user 415 is presented with a login page 300 and enters credentials such as user name 301 and password (e.g., as shown in FIGS. 3A-C) to initiate an online banking session. At 1008, the modification module 426 receives or captures user profile data 414c of the current online banking session ("c" referring to profile data for the current online banking session) and at 1010 accesses the rules 632. At 1012, the rule engine 630 compares the received or captured user profile data 414c of the current online banking session with segments or conditions of rules 632 having logged user profile data 414, e.g., within the "if" segment of rule 632 structured as an "if-then" rule. At 1014, the rule engine 630 determines whether there is a rule 632 that applies for the current online banking session based at least in part upon the comparison involving the user profile data 414c, and if so, then at 1016, the method continues to FIG. 11 for modification of the UI or interaction 413. If not, then at 1018, no modification to the UI or interaction 413 experienced by the user 415 is implemented at this time. Thus, the OLB website pages 423 can be navigated according to their original pre-defined browsing structure/page sequence as if no modification were implemented.

Figure 11:
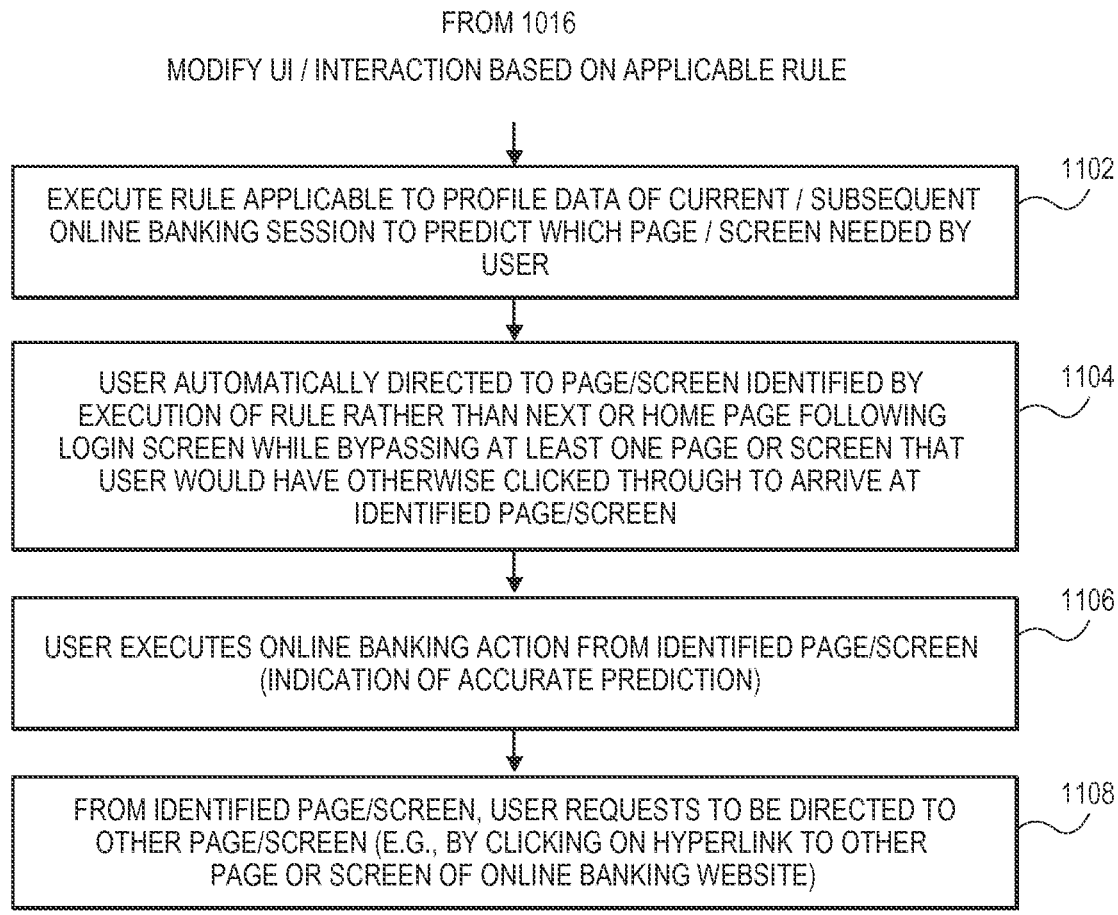
FIG. 11 is a flow diagram illustrating how embodiments are implemented by applying the identified rule to modify a user interface or interaction experienced by the user while utilizing the online banking website.

Referring to FIG. 11, when it is determined that there is a rule 623 that applies for the current online banking session, at 1102, the rule engine 630 that rule 632 is selected or identified as being applicable to or involving the user profile data 414c of the current online banking session to predict which page 423 of the OLB website 422 will be needed by the user 415, and at 1104, the rule engine 630 executes that rule 632 and provides the results or instructions to the OLB program 431, or the rule engine 630 provides the identified or selected rule to the OLB program 431 which executes or applies the rule 632, with the result that the OLB program 431 identifies a page 423 as a result of execution of the rule 632 and automatically directs the user's browser 411 to that identified page 423. Thus, without embodiments, the user 415 would simply be directed to the home page following the login page 300, but with embodiments, the user 415 is directed from the login page 300 to a different page 423 as a result of the applied rule 623. The page 423 to which the user 415 is directed according to embodiments is a page other than the next or home page following the login page 300, thus directing the user 415 to the page predicted to be the subject of the current online banking session while bypassing at least one page or screen that user 415 would have otherwise clicked or navigated through to arrive at the identified page as a result of application of the rule 623.

Embodiments may implement these modifications in different ways. In one embodiment, the OLB program 431 does not modify the OLB website 422 itself and instead causes the page 423 identified by application of the rule 632 to be presented to the user 415 out of order compared to the OLB website 422 structure, and in embodiments described, the user 415 is taken directly from the login page 400 to that identified page 423. After being redirected to the identified page 423, the user 415 can then navigate from that identified page 423 using the OLB website 422 as if the user 415 had navigated to the identified page without being redirected to it from the login page 300.

In another embodiment, the OLB program 431 creates a temporary, modified version of the OLB website 422 incorporating the result of the rule 632. The temporary, modified version is for that particular online banking session. For example, after the user 415 logs in and the OLB program 431 receives a result or rule 632 from the rule engine 630, the OLB program 431 may be triggered to make a temporary copy of the OLB website 422 incorporating the page sequence change resulting from application of the rule 632, and that temporary OLB website copy is then used for that online banking session such that the user 415 is directed from the login page 300 to the page that was the subject of application of the rule 632. When the user 415 logs out to terminate the online banking session, the temporary OLB website can be deleted such that when the user 415 logs in again, the user 415 logs into the original OLB website 422 and embodiments can be applied again to determine whether the UI or interaction 413 with the OLB website 422 should be modified.

Further, while embodiments have been described with reference to a rule 632 identifying a single page 423 and presenting that single page out of order compared to the OLB website 422 structure, embodiments may also involve modifying the UI or interaction 413 by identifying multiple pages 423 or a sequence of pages and presenting those pages to the user 415. For example, the modification module 426 may predict that when the user 415 logs in on the first of the month, the user 415 executes a sequence of actions 424 or visits a sequence of pages 423 such as viewing checking account transaction history, executing a transfer of funds, and paying one or more bills. Thus, after the user 415 logs in, the user 415 may then be directed or jump from the login page 300 to the transaction history page, then to the funds transfer page, and then to the bill pay page. These directions or jumps may be executed automatically or by presenting a message or window to the user 415 from which the user can select which page 423 to visit.

For example, when the user 415 is at the transaction history page, a message may be presented to the user 415 asking the user 415 if the user 415 wants to proceed to the next page 423 in the sequence such as "Do you want to go to the funds transfer page?" and so on for other pages 423 in the sequence.

In yet other embodiments, the user 415 can be given the choice of which page 423 in a sequence to jump to from a current page other than the home page following the login page 300. Continuing with the above example, if embodiments were applied to determine that when the user 415 logs in on the first of the month, the user 415 executes actions 424 of viewing transaction history, transfer and bill pay, the modification module 426 is configured according to embodiments may cause all three pages to be presented as options such that the user 415 can select which page 423 to jump to next. Thus, the modification module 426 provides this option as a result of execution of the rules 632 and independently of the pre-defined OLB website 322 structure. Thus, these embodiments, while not following a determined sequence, present predicted options of which pages 323 to jump to according to application of one or more rules 632.

Continuing with FIG. 11, at 1106, the user 451 executes online banking action(s) 424 using pages identified according to embodiments, and if desired, the user 451 can navigate the OLB website 422 from the page 423 to which the user 415 was directed.

Further, if an action 424 is executed from a page 423 identified and presented according to embodiments, this is an indicator of an accurate prediction according to embodiments, and this data can be stored in the database 427, or the table 800 of FIG. 8 can be updated with "action" feedback or "indirect" feedback to reflect that an action 424 was performed from a predicted page 423 presented to the user 425 according to embodiments for future rule 632 confirmation or to determine whether a rule 632 should be modified.

Figure 12:
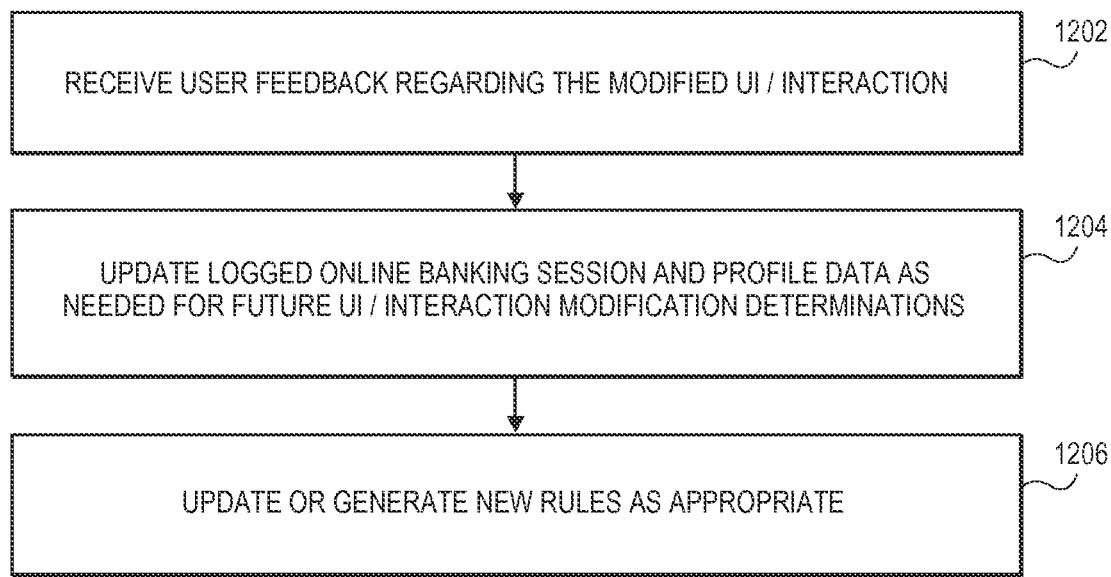
FIG. 12 is a flow diagram illustrating how embodiments may utilize user feedback regarding predictions made in order to determine the effectiveness of predictions that were made.

Referring to FIG. 12, the modification module 426 may also request feedback from the user. In one embodiment, at 1202, after the user 415 has been directed to the page 423 that was the subject of application of a rule 632, the modification module 426 may present a message to the user 415 requesting the user's feedback regarding being directed to this page 433. The user 415 may then respond to this message with feedback regarding the modified UI or user interaction 413. At 1204, the modification module 426 may then update the log 612 with data of the current online banking session including pages 423 viewed, actions 424 performed, whether a page 423 that was viewed or an action 424 that was performed was the subject of a prediction or application of a rule 632 according to embodiments, and the associated user profile data 414. At 1206, the updated or supplemented log 612 may then be analyzed again to update or modify an existing rule, generate a new rule, or delete a prior rule.

Further, data of the current online banking session can be added to the log, and the pages 423 viewed or actions 424 performed can be linked or associated with the user profile data 414 of that online banking session, and this supplemented log 612 may then be processed by the analyzer 620 and rule engine 630 periodically or at pre-determined times, e.g., after termination of each online banking session, to confirm a recurring action 424r and applicable rule 632, identify new recurring actions 424r, whether an action 424r that was identified as a recurring action should no longer be categorized as such (e.g., based on the log data no longer satisfying the pre-determined criteria), and whether to maintain or modify a rule 632 or generate a new rule 632 given a new recurring action 424r as appropriate.

Thus, embodiments may utilize indirect and direct feedback mechanisms and/or supplement logs 612 and repeat analysis of recurring actions 424r to provide an intelligent, self-learning system that can adapt to how users 415 utilize the OLB website 422 and to adapt to changes in user 415 behavior, e.g., if the user 415 has to pay more bills throughout the month as a result of signing up for satellite television or setting up bills that were paid by mail in the past with electronic bill payment through the OLB website 422 instead.

Having described embodiments and the manner in which users 415 may be redirected to a page 423 of an OLB website 422 that is out of sequence compared to the pre-defined navigation structure of the OLB website 422, certain examples of how embodiments may be implemented and utilized are described. While these examples involving changing the OLB website UI or interaction 413 from the point of the login page 300, it will be understood that embodiments are not so limited.

One example of how embodiments may be implemented involves the user 415 immediately navigating to their transaction history in the pre-defined OLB website navigation structure. Thus, in this example, the recurring action 424r is viewing transaction history, and the user profile data 414r is temporal data of one or more of date, time and frequency of the recurring action of viewing transaction history. With embodiments logging and analyzing data of the prior online banking sessions and generation or application of a rule 632 involving the pertinent user profile data 414r, the next time the user 415 logs in, the user 415 is immediately directed from the login page 300 directly to the transaction history page, bypassing at least one intermediate page 423 (at least the home page that is presented after the login page 300) that would have otherwise been navigated according to the pre-defined OLB website 422 structure.

Another example, of how embodiments may be implemented involves the user 415 previously navigating to the bill pay page to execute an electronic bill paying on the $12^{th}$ of every month. In this example, the recurring action 424r is executing a bill payment, and the user profile data 414r is temporal data of an action on the same date ($12^{th}$) of each month or frequency (monthly). With embodiments logging and analyzing data of the prior online banking sessions and generation or application of a rule 632 involving the pertinent user profile data 414r, when the user 415 logs in next time on the $12^{th}$, the user 415 is immediately directed from the login page 300 directly to the bill pay page, bypassing at least one intermediate page 423 (at least the home page that is presented after logging in) that would have otherwise been navigated according to the pre-defined OLB website 422 structure.

A further example of how embodiments may be implemented involves the user 415 consistently navigating to the bill pay page to pay the same bill to the same vendor every month. In this example, the recurring action 424r is executing a bill payment, and the user profile data 414r is temporal data of an action on the same date of each month or frequency (monthly). With embodiments logging and analyzing data of the prior online banking sessions and generation or application of a rule 632 involving the pertinent user profile data 414r, when the user 415 logs in next time, the user 415 is immediately directed from the login page 300 directly to the bill pay page ready for payment to that particular vendor, bypassing at least one intermediate page 423 (at least the home page that is presented after logging in) that would have otherwise been navigated according to the pre-defined OLB website 422 structure. Further, with embodiments, if the bill amount is the same, the page 423 to which the user 415 is directed can have the amount field already populated with the amount of the bill to be paid.

Yet another example of how embodiments may be implemented involves the user 415 logging in every Friday to see if their paycheck has been electronically deposited into the account 432. In this example, the recurring action 424r is checking transaction history of the account 432 to which an electronic paycheck deposit is to be made, and the user profile data 414r is temporal data of an action on the same day (Friday) of every week. With embodiments logging and analyzing data of the prior online banking sessions and generation or application of a rule 632 involving the pertinent user profile data 414r, when the user 415 logs in the following Friday, the user 415 is immediately directed from the login page 300 directly to the transaction history of that particular account 432 to display the transaction history, bypassing at least one intermediate page 423 (at least the home page that is presented after logging in) that would have otherwise been navigated according to the pre-defined OLB website 422 structure. In contrast, if the user 415 were to log in on Thursday or Saturday, embodiments would not result in directing the user 415 from the login page 300 to the transaction history for that account 432 and instead may direct the user 415 to a different page 423 according to embodiments, or involve no UI or interaction 413 change such that the user 415 would navigate the OLB website 422 according to the original pre-defined interaction structure.

Continuing the above example, if the user 415 logs in every other Friday to check if their electronic paycheck has been deposited, the analyzer 620 will detect the recurring action 424r of checking transaction history, and the user profile data 414r is temporal data of an action on the same day of every other week, rather than every week. Thus, with embodiments logging and analyzing data of the prior online banking sessions and generation or application of a rule 623 involving the same day of every other week, the user 415 will be immediately directed to the transaction history for Friday, the 1$^{st}$, but not Friday the 8$^{th}$, but will be immediately directed to the transaction history page for Friday, the 15$^{th}$, but not Friday, the 22$^{nd}$, and so on given the rule 623 applicable for every other Friday. Thus, if the modification module 426 does not make any other UI or interaction 413 changes for Friday the, the 8$^{th}$ and Friday, the 22$^{nd}$, the user 415 would navigate the pre-defined interaction structure of the OLB website 433 without any modification.

A further example involves the user 415 making purchases that are reflected in the account 432 at the same shopping center and checking their balances with a computing device 410 in the form of a mobile communication device such as a smartphone. Thus, in this example, the recurring action 424r that is detected is checking an account balance, and user profile data 414r involves one or more of computing device 410 identification (smartphone) and location (e.g., shopping center location and/or location of mobile communication device determined by GPS and/or IP address). Location may be determined by data transmitted from the mobile communication device or from Internet communications used to log in from the mobile communication device. In this case, the analyzer 620 detects the recurring action 424r and the location-based user profile data 414r is computing device 410 and location data. Thus, with embodiments logging and analyzing data of the prior online banking sessions and generation or application of a rule 632 involving the mobile communication device and shopping center location and/or mobile communication device location such that when such user profile data 414r is received, detected or derived, the user 415 will log in using the mobile communication device and then be immediately directed to the transaction history for Friday, the 1$^{st}$, but not Friday the 8$^{th}$, but will be immediately directed to the page with account balances or a page including balance of a particular account 432.

Figure 13:
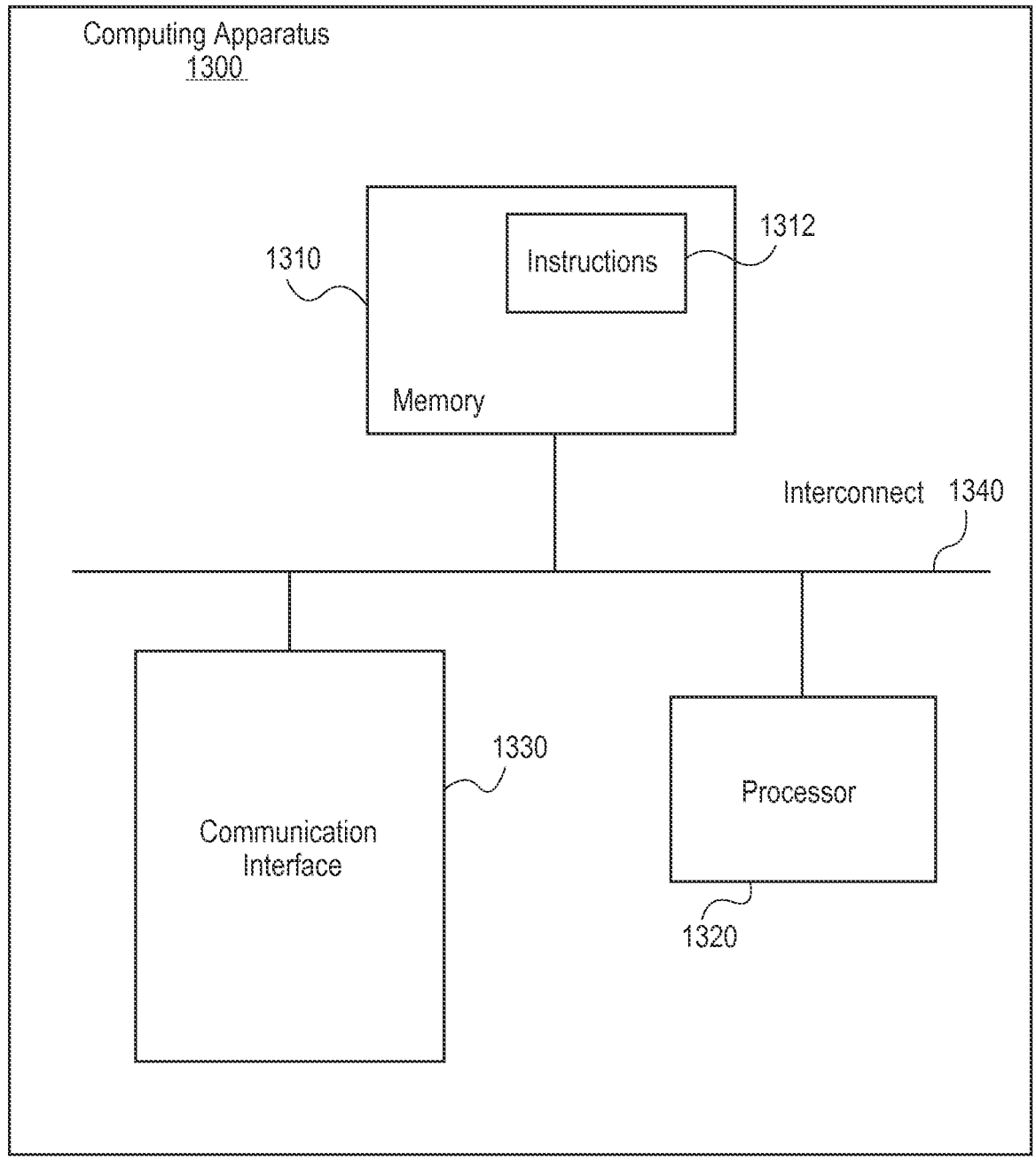
FIG. 13 is a block diagram of components of a computing apparatus or system in which various embodiments may be implemented or that may be utilized to execute various embodiments.

Referring to FIG. 13, generally illustrates components of a computing device 1300 that may be utilized to execute embodiments and that includes a memory 1310, account processing program instructions 1312, a processor or controller 1320 to execute account processing program instructions 1312, a network or communications interface 1330, e.g., for communications with a network or interconnect 1340 between such components. The memory 1310 may be or include one or more of cache, RAM, ROM, SRAM, DRAM, RDRAM, EEPROM and other types of volatile or non-volatile memory capable of storing data. The processor unit 1320 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 1340 may include a system bus, LDT, PCI, ISA, or other types of buses, and the communications or network interface may, for example, be an Ethernet interface, a Frame Relay interface, or other interface. The network interface 1330 may be configured to enable a system component to communicate with other system components across a network which may be a wireless or various other networks. It should be noted that one or more components of computing device 1300 may be located remotely and accessed via a network. Accordingly, the system configuration provided in FIG. 13 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 1320 performs steps or executes program instructions 1312 within memory 1310 and/or embodied on the carrier to implement method embodiments. Further, embodiments may reside and execute on a mobile communication device such as a cellular telephone or smartphone.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, it will be understood that logged or stored data can be analyzed to identify one or multiple recurring actions and associated one or more types of user profile data. Moreover, rules may involve UI or interaction modifications following login to the account or launch of an application or program, e.g., executing on a mobile communication device, but other embodiments may involve directing the user to a sequence of multiple pages or presenting pages to the user for selection, thus serving up modified UI or interactions as predicted from analysis of the logged page/screen and user profile data.

Further, while embodiments are directed to a user accessing an intermediate computer hosting the OLB program and modification module, other embodiments may involve a FI computer executing these components and the user accessing the FI computer directly.

Further embodiments may involve UI or interaction modification while accessing the OLB website using a computer or other computing device such as a mobile communication device, in which case embodiments may be included within an application executing on the mobile communication device.

Additionally, while certain embodiments have been described with reference UI to modifying a UI or user interaction with an OLB website, embodiments may also be utilized to modify a UI or user interaction with other financial services and accounting applications such as QUICKBOOKS online accounting application. QUICKBOOKS is a registered trademark of Intuit Inc., Mountain View, Calif.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for modifying operation of an online banking website having a pre-defined interaction structure, the predefined interaction structure comprising a fixed sequence of pages or screens that a user can navigate to reach a page or screen accessed by the user to execute a recurring online banking action, the method being performed by a computer and comprising:

the computer logging data of online banking sessions and respective user profile data of respective online banking sessions;

the computer analyzing logged data of prior online banking sessions performed by the user and identifying the page or screen of the online banking website accessed by the user to execute the recurring online banking action during respective different online banking sessions, and respective user profile data associated with the recurring online banking action; and after logging and analyzing prior online banking session data, the computer, for the current online banking session:

receiving credential data entered by the user into a login page of the online banking website, receiving user profile data of a current online banking session, comparing the user profile data of the current online banking session and logged user profile data and determining whether the user profile data of the current online banking session and the logged user profile data match, and automatically presenting, without further user interaction, the identified page or screen associated with the logged user profile data to the user based at least in part upon the user profile data of the current online banking session matching logged user profile data such that at least one other previously stored page or screen of the pre-defined interaction structure that would have been presented to the user while navigating to the identified page or screen is bypassed and the user is transferred to the identified page or screen directly without navigating through any intermediate page or screen of the pre-defined interaction structure and without the user requesting the identified page or screen, wherein the user profile data identifying or indicating a type of computing device utilized to access the online banking website, a frequency the user accessed the online banking website, and a location of the computing device associated with the recurring online banking action, the location of the computing device being based on positioning system data, and when the user profile data of the current online banking session matches logged user profile data, said computer further identifying a rule involving the matching logged user profile data and determining the identified page or screen being based at least in part upon execution of the rule;

generating a temporary copy of the online banking website, wherein the identified page or screen is automatically presented to the user by the temporary copy of the online banking website; and deleting the temporary copy of the online banking website after the current online banking session has been terminated.

2. The method of claim 1, else when the user profile data of the current online banking session does not match logged user profile data, the computer presenting the online website to the user such that the user can navigate the pre-defined interaction structure without bypassing any pages or screens of the pre-defined interaction structure.

3. The method of claim 2, when the user profile data of the current online banking session does not match logged user profile data, the computer presenting a home page of the online banking website to the user after the user logs into the financial account.

4. The method of claim 1, wherein the identified page or screen that is automatically presented to the user without further user interaction is the next page or screen presented to the user after the user logs into the financial account by entering the user's login credentials.

5. The method of claim 1, logging data of online banking sessions being triggered based at least in part upon the user initiating an online banking session by logging into the financial account.

6. The method of claim 1, logging data comprising logging data of a plurality of different online banking sessions that occurred at different times during which respective online banking actions were executed.

7. The method of claim 1, identifying the page or screen of the online banking website accessed by the user to execute the recurring online banking action comprising:

identifying within the logged data multiple instances of execution of the same online banking action; and identifying the page or screen utilized to execute the same online banking action.

8. The method of claim 7, wherein the user profile data associated with each of the multiple instances of execution of the same online banking action is the same.

9. The method of claim 7, wherein different user profile data is associated with different instances of execution of the same online banking action.

10. The method of claim 7, the screen or page being identified for presentation to the user and bypassing at least one other page or screen of the pre-defined interaction structure after the computer identifies a pre-determined minimum number of instances of execution of the same online banking action within the logged data.

11. The method of claim 10, the recurring online banking action is identified based at least in part upon identifying at least three instances of the same online banking action during three different online banking sessions.

12. The method of claim 1, the pre-defined interaction structure comprising a plurality of linked pages or screens for presentation to the user in a pre-defined sequence.

13. The method of claim 1, wherein after the user logs into the financial account through the online banking website, the identified page or screen is presented to the user before any other page or screen of the online banking website is presented to the user.

14. The method of claim 1, further comprising the computer identifying within logged data:

a second page or screen of the online banking website accessed by the user to execute a second recurring online banking action during respective different online banking sessions, and respective second user profile data associated with the second recurring online banking action; and for the current online banking session, the computer comparing the second user profile data of the current online banking session and logged user profile data, and when the second user profile data matches logged user profile data, and presenting the second identified page or screen associated with the logged user profile data matching the second user profile data to the user such that at least one page or screen of the pre-defined interaction structure that would have been presented to the user while navigating to the second identified page or screen is bypassed.

15. The method of claim 1, the user profile data further indicating how the user accessed the online banking website.

16. The method of claim 1, the location comprising a residence or a place of employment of the user.

17. The method of claim 1, the user profile data further indicating when the user accessed the online banking website.

18. The method of claim 17, the user profile data indicating at least one of a date and a time the user accessed the online banking website.

19. The method of claim 1, the user profile data further comprising a date and a time the user accessed the online banking website.

20. The method of claim 1, further comprising the computer determining that a rule does not exist for user profile data of the current online banking transaction that matches logged user profile data, and generating a new rule or updating an existing rule to indicate that the identified page or screen should be presented when user profile data of the current online banking session matches logged user profile data associated with the identified page or screen.

21. The method of claim 1, further comprising the computer receiving feedback from the user regarding the identified page or screen that was presented to the user during the current online banking session; and generating a new rule or updating an existing rule based at least in part upon the received feedback.

22. The method of claim 1 being performed by a computer of the financial institution hosting the online banking website and the financial account.

23. The method of claim 1 being performed by an intermediate computer in communication with a computing device of the user and a computer of the financial institution through respective networks, the intermediate computer hosting the online banking website and accessing the financial account the user has at the financial institution.

24. The method of claim 1, wherein the user is directed to the identified page or screen without a use of a browser bookmark.

* * * * *